United States Patent [19]

Jahnke

[11] 4,191,658
[45] Mar. 4, 1980

[54] HOT MELT METAL WORKING LUBRICANTS AND METHODS FOR THEIR APPLICATION

[75] Inventor: Richard W. Jahnke, Mentor-on-the-Lake, Ohio

[73] Assignee: The Lubrizol Corporation, Wickliffe, Ohio

[21] Appl. No.: 903,640

[22] Filed: May 8, 1978

Related U.S. Application Data

[60] Division of Ser. No. 731,060, Oct. 27, 1976, abandoned, which is a continuation-in-part of Ser. No. 547,896, Feb. 7, 1975, abandoned, which is a continuation-in-part of Ser. No. 513,617, Oct. 10, 1974, abandoned.

[51] Int. Cl.$^2$ .............. C10M 5/24; C10M 5/22; C10M 7/46; C10M 7/24
[52] U.S. Cl. .............. 252/32.7 E; 72/42; 252/32.5; 252/56 R; 252/56 S; 252/56 D; 252/389 A; 252/396; 427/374 R
[58] Field of Search .............. 252/389 A, 396, 32.5, 252/32.7 E, 56 R, 56 S, 56 D; 427/374 R; 72/42

[56] References Cited

U.S. PATENT DOCUMENTS

| | | | |
|---|---|---|---|
| 2,134,736 | 11/1938 | Reuter | 252/56 S |
| 2,774,684 | 12/1956 | Fucinari | 252/35 |
| 3,252,909 | 5/1966 | Jenks | 252/56 S |
| 3,684,711 | 8/1972 | Thompson et al. | 252/32.5 |
| 3,755,174 | 8/1973 | Trites | 252/56 R |
| 4,116,872 | 9/1978 | Jahnke | 252/32.7 E |
| 4,118,331 | 10/1978 | Jahnke | 252/32.7 E |

FOREIGN PATENT DOCUMENTS

| | | | |
|---|---|---|---|
| 651610 | 11/1962 | Canada | 252/56 S |
| 821503 | 8/1969 | Canada | 252/56 S |

*Primary Examiner*—Irving Vaughn
*Attorney, Agent, or Firm*—James W. Adams, Jr.; William H. Pittman

[57] ABSTRACT

Metal working operations, especially drawing, are facilitated by applying to the metal a composition which provides lubricity thereto and which melts within the range of about 30°–100° C. The composition comprises at least one ester of a carboxylic acid, with a carboxylic acid or derivative thereof, a phosphorus acid salt and an antioxidant being preferred optional ingredients. The composition may be applied in liquid form and solidifies on cooling to ambient and normal storage temperatures. Prior to application, the composition is preferably heated to a temperature higher than its melting temperature for ease of flow and uniform dispersion thereof onto the metal. In a preferred method of application, a reservoir is located beneath the composition applicator and composition is pumped therefrom to the applicator, preferably a roller coater, with excess composition being recirculated. Steam may be used both to heat the composition to melting point and purge the pump and circulation piping at the start and finish of each run.

31 Claims, 3 Drawing Figures

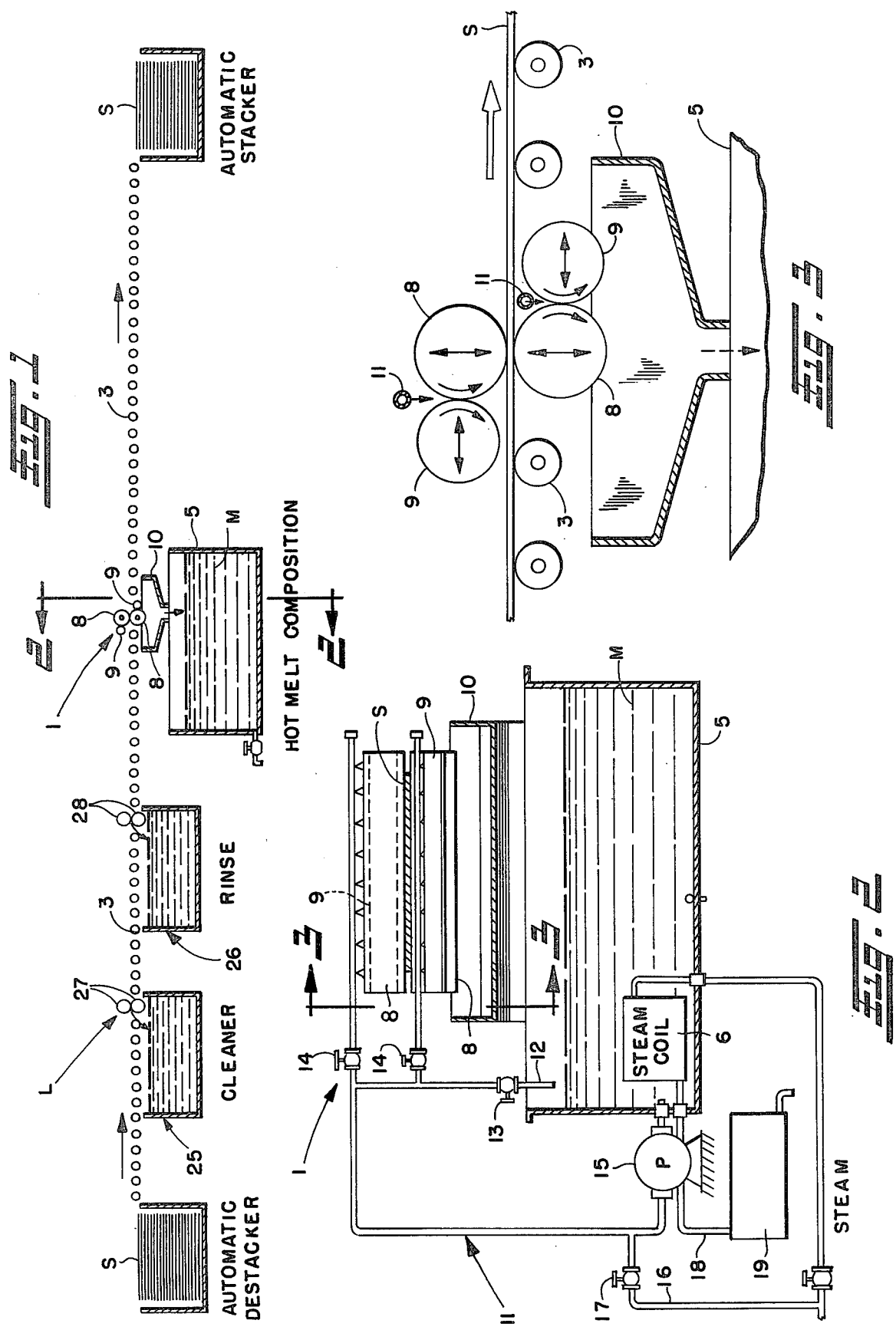

HOT MELT METAL WORKING LUBRICANTS AND METHODS FOR THEIR APPLICATION

This application is a division of copending application Ser. No. 731,060, filed Oct. 27, 1976, which is a continuation-in-part of application Ser. No. 547,896, filed Feb. 7, 1975, which in turn is a continuation-in-part of application Ser. No. 513,617, filed Oct. 10, 1974, all now abandoned.

This invention relates to metal working operations. More particularly, it relates to compositions useful as lubricants during such operations, to methods for lubricating metal during such operations and for applying lubricant to such metal, and to metal workpieces so lubricated.

Metal working operations, for example, rolling, forging, hot-pressing, blanking, bending, stamping, drawing, cutting, punching, spinning and the like generally employ a lubricant to facilitate the same. Lubricants greatly improve these operations in that they can reduce the power required for the operation, prevent sticking and decrease wear of dies, cutting bits and the like. In addition, they frequently provide rust inhibiting properties to the metal being treated.

Since it is conventional to subject the metal to various chemical treatments (such as the application of conversion coating solutions) after working, a cleaning operation is necessary between the working step and the chemical treatment step. In addition to the above properties, therefore, it is preferred that the working lubricant be easily removable from the metal surface by ordinary cleaning compositions.

Heretofore, the lubricants applied for the above purposes have ordinarily been liquids. The equipment used for the application of such liquids is often expensive to maintain and inconvenient to use. In addition, a dry-off oven is usually required to remove the water or solvent carrier from the liquid composition, which also greatly adds to the capital costs and operating and maintenance expenses of the method. Difficulties are also often encountered in automatic feeding of metal blanks and otherwise handling the metal because the liquid compositions which are normally applied to the metal make it wet and slippery and consequently difficult to handle.

A principal object of the present invention, therefore, is to provide an improved metal working method.

A further object is to provide a method using lubricants which impart to the metal being worked a unique combination of properties including lubricity, corrosion resistance, extreme pressure properties and protection against wear of working parts, and which in addition are relatively easy to remove from the surface of the metal by cleaning after the working operation is completed.

A further object is to provide novel compositions for use in the improved method.

Another object is to provide a method by which a solid metal working composition can be melted and applied to the metal, thereby eliminating the need for dry-off ovens and their attendant drawbacks.

Still another object is to provide a method by which the composition, after application to the metal, solidifies to produce a non-blocking and relatively non-slippery film, thus allowing consistent and economical automatic feeding of blanks and material handling at reduced costs.

A still further object is to provide a method which permits the formation of a solid film of metal working composition on the surface of a metal workpiece by applying the melted composition to the metal surface while the latter (e.g., as wire, tubing or the like) is moving through the application means at relatively high speed.

Other objects will in part be obvious and will in part appear hereinafter.

According to this invention, the above objects are fulfilled by applying to the metal to be worked a composition which provides lubricity thereto and which comprises at least one ester of a carboxylic acid, said composition melting within the range of about 30°–100° C. Preferably, the composition melts to form a readily flowable liquid which is capable of easy and efficient application to the metal surface. One advantage of such a composition (sometimes referred to hereinafter as the "hot melt composition") is that metals coated therewith are easier to handle under normal storage conditions than metals coated with previously known lubricants.

The principal necessary characteristic of the hot melt composition is its capability of providing lubricity to the metal surface. For this purpose, lubricity may be defined in many ways which are well known to those skilled in the art, and in terms of a number of test methods which, in one way or another, simulate metal working operations. For the purpose of this invention, a composition is deemed to provide lubricity to a metal workpiece if its use results in a deviation of 100 foot-pounds or less when tested by the following method:

A cold-rolled steel strip, $2'' \times 13\frac{1}{2}''$, is drawn between two dies in an Instron Universal Tester, Model TT-C. Prior to drawing, the edges of the strip are deburred and the strip is vapor degreased and wiped with a clean cloth. It is then coated uniformly with a drawing lubricant and mounted in the testing machine. The dies are tightened by means of a torque wrench set at 40 foot-pounds torque and the strip is pulled through the die for two inches at the rate of five inches per minute. The force or "load", in foot-pounds, required to pull the strip through the die, and the deviation from a uniform load, are recorded on a chart.

The hot melt composition melts in the range of 30°–100° C., as previously indicated. Thus, it is normally solid at ambient temperature and pressure. The preferred melting range is 35°–70° C., with 38°–55° C. being particularly desirable. When melted, the composition preferably forms a readily flowable liquid.

The principal ingredient of the hot melt composition is at least one ester of a carboxylic acid. Typical esters are those of acids having the formula $R(COOH)_m$ and organic hydroxy compounds having the formula $R'(OH)_{n'}$ wherein each of m and n is an integer from 1 to 3, R is a hydrocarbon-based radical, and R' is a hydrocarbon-based or poly(oxyalkylene) radical. As used herein, the term "hydrocarbon-based radical" denotes a radical having predominantly hydrocarbon character within the context of this invention. Such radicals include the following:

(1) Hydrocarbon radicals, which may be aliphatic (e.g., alkyl or alkenyl), alicyclic (e.g., cycloalkyl or cycloalkenyl), aromatic, aliphatic- and alicyclic-substituted aromatic, aromatic-substituted aliphatic and alicyclic, and the like.

(2) Substituted hydrocarbon radicals, that is, radicals containing non-hydrocarbon substituents which, in the context of this invention, do not alter the predominantly hydrocarbon character of the radical. Suitable substituents of this type will be apparent to those skilled in the art.

(3) Hetero radicals; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbon-based radical.

The hydrocarbon-based radicals are usually free from acetylenic and conjugated diene unsaturation and they preferably contain no more than one olefinic double bond.

The acid typically contains about 4–25 carbon atoms. The preferred acids are the aliphatic carboxylic acids, especially those in which R is an alkyl or alkylene radical which may be branched or linear. Exemplary acids are propionic, butyric, stearic, oleic, benzoic, maleic, fumaric, succinic, adipic, glutaric, pimelic, sebacic, azelaic, suberic, phthalic, isophthalic, citric and trimetallitic acids. The particularly preferred acids are the aliphatic monocarboxylic acids having about 12–25 carbon atoms and polycarboxylic, especially dicarboxylic, acids having about 5–10 carbon atoms.

The organic hydroxy compounds in which R' is a hydrocarbon-based radical typically contain at least about 10 and generally about 10–25 carbon atoms. Usually, n is 1 and R' is an alkyl radical which may be branched or linear. Exemplary organic hydroxy compounds are 1-butanol, 2-buten-1-ol, phenol, resorcinol, ethylene glycol, decanol, dodecanol, tetradecanol, stearyl alcohol, oleyl alcohol, eicosanol, and commercial mixtures of such alcohols. The preferred alcohols of this type are saturated aliphatic alcohols containing at least about 10 carbon atoms, especially $C_{14-20}$ alkanols (that is, saturated monohydroxy alcohols) and more especially predominantly straight-chain alkanols.

Another class of suitable organic hydroxy compounds consists of the polyalkylene glycols, especially the polyethylene and polypropylene glycols and preferably the former. The most desirable polyalkylene glycols are those containing about 20–50 oxyalkylene units. Such polyalkylene glycols are normally available as commercial mixtures such as the "Carbowax" polyethylene glycols sold by Union Carbide.

From the above descriptions of suitable acids and organic hydroxy compounds, it will be apparent that a wide variety of carboxylic acid esters are contemplated for use according to this invention. These include both neutral esters and acidic esters (e.g., monoesters of dicarboxylic acids), but neutral esters are preferably used. Both mono- and bis-esters of polyhydroxy compounds are contemplated.

The preferred esters are of two types. Type A comprises neutral esters of saturated aliphatic alcohols having at least about 10 and preferably up to about 25 carbon atoms and aliphatic polycarboxylic acids having about 4–20 carbon atoms. Especially preferred within Type A are esters of $C_{5-10}$ alkanedioic acids such as adipic, azelaic and sebacic acids and $C_{14-20}$ alkanols (particularly 1-alkanols) or commercial mixtures of such alkanols.

Type B comprises esters of $C_{12-25}$ aliphatic monocarboxylic (preferably alkanoic) acids such as myristic, palmitic and stearic acids, preferably stearic acid, and polyalkylene glycols (e.g., polyethylene or polypropylene glycol, the former being preferred) containing about 20–50 polyoxyalkylene units.

Mixtures consisting of about 5–95% by weight, and preferably about 5–20%, of esters of Type A, the balance being esters of Type B, are particularly desirable for the purposes of this invention.

The preferred hot melt compositiions contain, in addition to the esters described hereinabove, at least one rust inhibiting component and/or at least one agent to improve extreme pressure properties.

Among the suitable rust inhibiting materials are carboxylic acids and derivatives thereof. The term "derivative" as used herein with reference to such carboxylic acids includes:

Anhydrides.

Esters (acidic or neutral), especially those prepared from lower saturated aliphatic (the word "lower" meaning up to 7 carbon atoms) monohydroxy or polyhydroxy compounds (e.g., methanol, ethanol, 1-butanol, n-hexanol, ethylene glycol, pentaerythritol) or epoxides (e.g., ethylene oxide, propylene oxide). The epoxide-derived esters, as will be readily understood, are hydroxy esters. It will be appreciated that if the "derivative" is an ester, the hot melt composition comprises at least two esters.

Salts (neutral, acidic or basic) in which the cation is a Group I metal, a Group II metal, aluminum, tin, cobalt, lead, molybdenum, manganese, nickel or ammonium (the latter including substituted ammonium, i.e. amine) including salts of the free acids and of their hydroxy esters. The lithium salts are preferred for their anti-rust properties.

Amides and amide-imide mixtures, especially those derived from aliphatic amines and more especially from lower aliphatic amines. The preferred amines are the alkylene polyamines, particularly ethylene polyamines.

Derivatives of the type described above may be obtained from the acids by known reactions or sequences of reactions.

The free acids, their lithium salts, and their anhydrides are most useful. Preferred are the aliphatic mono- and polycarboxylic acids (and derivatives thereof as defined hereinabove) containing at least about 8 carbon atoms. Particularly desirable are the dibasic acids, especially the anhydrides of succinic acids having a hydrocarbon-based substituent (as defined hereinabove), such as those prepared by the reaction (more fully described hereinafter) of maleic acid or maleic anhydride with a hydrocarbon-based compound containing at least about 6 carbon atoms, preferably about 6–75 and most often about 10–20 carbon atoms.

The hydrocarbon-based compounds preferred for the preparation of the substituted succinic acid are those derived from substantially saturated petroleum fractions and olefin polymers, particularly oligomers of monoolefins (especially terminal monoolefins) having from 2 to about 10 carbon atoms. Thus, the hydrocarbon-based compound may be derived from a polymer of ethylene, propene, 1-butene, 2-butene, isobutene, 3pentene, 1-octene or the like. Also useful are interpolymers of olefins such as those illustrated above with other polymerizable olefinic substances such as styrene, chloroprene, isoprene, p-methylstyrene, piperylene and the like. In general, these interpolymers should contain at least about 80%, preferably at least about 95%, on a weight basis of units derived from the aliphatic monoolefins.

Other suitable hydrocarbon-based compounds are mixtures of saturated aliphatic hydrocarbons such as highly refined high molecular weight white oils or synthetic alkanes.

In some instances, the hydrocarbon-based compound should contain an activating polar radical to facilitate its reaction with the low molecular weight acid-producing compound. The preferred activating radicals are halogen atoms, especially chlorine, but other suitable radicals include sulfide, disulfide, nitro, mercaptan, ketone and aldehyde groups.

As previously noted, the preferred method for producing the carboxylic acid or derivative thereof is by the reaction of maleic acid or anhydride with the hydrocarbon-based compound, especially with a material such as a propene oligomer. This reaction involves merely heating the two reactants at about 100°–200° C. in the presence or absence of a substantially inert organic liquid diluent; an excess of a liquid reactant may also serve as the reaction medium. Other suitable reactions include oxidation with potassium permanganate, nitric acid or a similar oxidizing agent of a hydrocarbon-substituted 1,4-butanediol or the like; ozonolysis of a hydrocarbon-substituted 1,5-diene or the like; preparation of a bis-organometallic derivative of a hydrocarbon-substituted 1,2-dihalide or the like, followed by carbonation thereof with carbon dioxide; or preparation of a dinitrile followed by its hydrolysis. All of these reactions are well known in the art, as are the substituted succinic acids and derivatives thereof produced thereby.

The preferred extreme pressure agents are phosphorus acid salts of the formula

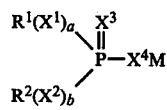

wherein M is a Group I metal, a Group II metal, aluminum, tin, cobalt, lead, molybdenum, manganese, nickel or ammonium; each of $R^1$ and $R^2$ is a hydrocarbon-based radical; each of $X^1$, $X^2$, $X^3$ and $X^4$ is oxygen or sulfur; and each of a and b is 0 or 1.

In the above formula, each of $R^1$ and $R^2$ is a hydrocarbon-based radical. Preferably, they are free from acetylenic and usually also from ethylenic unsaturation and have no more than about 30 carbon atoms, desirably no more than about 12 carbon atoms. They are usually hydrocarbon radicals such as methyl, ethyl, propyl, butyl, amyl, hexyl, octyl, decyl, dodecyl, vinyl, decenyl, cyclohexyl, phenyl and the like, all isomers thereof being included. A particular preference is expressed for compounds in which $R^1$ and $R^2$ are lower alkyl radicals, the word "lower" being defined hereinabove.

It will be apparent that the phosphorus acids from which the salts are derived include dialkylphosphoric acids, dialkylphosphinic acids, and thio derivatives of such acids. Especially preferred are the salts of phosphorodithioic acids; that is, compounds in which a and b are each 1, $X^1$ and $X^2$ are each oxygen, and $X^3$ and $X^4$ are each sulfur. In these salts, M may be any of the metals previously enumerated or ammonium: the latter term includes substituted ammonium salts (i.e., amine salts). M is preferably zinc or lead, especially zinc.

The hot melt composition most often contains up to about 15% by weight of the carboxylic acid or derivative thereof and/or up to about 25% of the phosphorus acid salt, both of which are optional ingredients. In particular, this invention includes compositions providing lubricity to metal and comprising an ester of a carboxylic acid and at least one of a carboxylic acid or derivative thereof and a phosphorus acid salt, each of said components being as defined hereinabove; said compositions melting at about 30°–100° C.

It is also within the scope of this invention to incorporate other known additives in minor amounts (typically about 0.01–0.5% by weight) into the hot melt composition. Especially preferred other additives are antioxidants, typically hindered phenols; such materials are well known in the art. Other suitable additives useful in these proportions include:

Surfactants, usually nonionic surfactants such as oxyalkylated phenols and the like.

Auxiliary extreme pressure agents such as chlorinated waxes, sulfurized hydrocarbons, sulfurized esters, etc.

Corrosion and wear inhibiting agents, and auxiliary rust inhibiting agents.

Friction modifying agents, of which the following are illustrative: Alkyl or alkenyl phosphates or phosphites in which the alkyl or alkenyl group contains about 10–40 carbon atoms, and metal salts thereof, especially zinc salts; $C_{10-20}$ fatty acid amides; $C_{10-20}$ alkyl amines, especially tallow amines, and ethoxylated derivatives thereof; salts of such amines with acids such as boric acid or phosphoric acid which have been partially esterified as noted above; $C_{10-20}$ alkyl-substituted imidazolines and similar nitrogen heterocycles; sulfurized derivatives of sperm oil and other fatty oils; basic barium or calcium salts of such oils or of amine-formaldehyde condensates, especially those derived from tallow amines such as described above; and gels derived from basic alkaline earth metal sulfonates.

Melting point modifiers, typically relatively low melting point esters such as dioctyl phthalate.

The invention also contemplates the use of hot melt lubricants containing waxes and waxy polymers, such as crystalline (including microcrystalline) and non-crystalline hydrocarbon waxes, hydroxylated hydrocarbon waxes, petrolatum, and low molecular weight olefin polymers, especially the polyethylenes sold as "Bareco Polywaxes" by Petrolite Corporation. Such waxes or polymers are typically present in amounts of about 0.25–1.0 part by weight per part of ester.

The hot melt composition may be prepared by intimately blending the ingredients thereof, preferably in the liquid state, if more than one ingredient is involved. It may sometimes be preferable to employ a substantially inert liquid diluent to insure intimate blending. By "substantially inert" is meant a diluent which does not undergo any appreciable reaction with the ingredients of the composition under the conditions of blending. Preferred as diluents are liquids which are solvents for the ingredients being blended; suitable solvents will be apparent to those skilled in the art and preferably comprise non-polar liquids such as benzene, toluene, xylene, chlorobenzene and the like. After blending is complete, the diluent is preferably removed, typically by evaporation.

It is also within the scope of the invention to incorporate a small particle size, pigment-type particulate solid in the hot melt lubricant to increase lubricity at temperatures above the melting point thereof. Suitable in this respect are such pigments as rutile titanium dioxide, anatase titanium dioxide, zinc oxide, leaded zinc oxide, zinc sulfide, lead titanate, antimony oxide, zirconium oxide, white lead, basic lead silicate, lithopone, titanated lithopone, titanium-barium pigment, titanium-calcium pigment, titanium-magnesium pigment, calcium carbonate, gilders whiting talc, barytes, magnesium silicate, aluminum silicates, diatomaceous earth, china clay, Asbestine, silica and mica. Calcium carbonate is especially preferred. The amount of such pigment is typically about 0.1–0.2 part by weight per part of ester.

In the following table are listed typical hot melt compositions suitable for use in the method of this invention.

| Ingredient | Parts by weight | | | | | |
|---|---|---|---|---|---|---|
| | A | B | C | D | E | F |
| Neutral adipic acid ester of commercial mixture of predominantly straight-chain $C_{14-18}$ 1-alkanols* | — | — | — | — | — | 9.5 |
| Neutral adipic acid ester of commercial mixture of predominantly straight-chain $C_{16-18}$ 1-alkanols* | 90 | 90 | — | 75 | — | — |
| Neutral azelaic acid ester of commercial mixture of predominantly straight-chain $C_{16-18}$ 1-alkanols* | — | — | 90 | — | 75 | — |
| Stearic acid ester of "Carbowax 1540", a polyethylene glycol containing an average of 22–48 oxyethylene units per molecule | — | — | — | — | — | 85.5 |
| Tetrapropenyl succinic anhydride | 10 | — | 10 | 10 | — | 5 |
| Dilithium salt of tetrapropenyl succinic acid | — | 10 | — | — | 10 | — |
| Zinc salt of a mixture of isobutyl- and primary amylphosphorodithioic acids | — | — | — | 15 | 15 | — |

*Available from Procter & Gamble

Any metal to be worked may be treated according to the method of this invention; examples are ferrous metals, aluminum, copper, magnesium, titanium, zinc and manganese as well as alloys thereof and alloys containing other elements such as silicon.

The method of this invention includes any method by which a metal workpiece may be coated with the hot melt composition prior to or concurrently with the working operation. For example, a cutting blade or drawing die may be coated with the composition which is then transferred to the workpiece by contact. More usually, however, the workpiece is coated with the hot melt composition before the working operation. Thus, this invention also contemplates a metal workpiece having on its surface a film of the hot melt composition, whether in solid or liquid form. The hot melt composition will ordinarily form a continuous film over the entire surface of the workpiece. However, it is also within the scope of this invention to form a film on less than the entire surface of the workpiece.

The physical state of the hot melt composition during application to the metal surface is not critical. Thus, it may be applied as a solid (as by rubbing) or as a liquid (as by brushing, spraying, dipping, flooding, roller coating, reverse roller coating or the like). For ease and convenience of application, it is preferably applied in the liquid state, and when this is done the metal may be subsequently cooled whereupon the hot melt composition solidifies, or it may be passed directly to the metal working operation while the composition is in the liquid state. One of the advantages of this invention, however, is that the hot melt composition solidifies to form a solid, non-blocking, non-slippery film on the metal workpiece, thus permitting convenient and safe material handling at reduced cost.

To this end, the present invention also includes a method (hereinafter sometimes referred to as "the application method of this invention") of applying to a metal workpiece a metal working composition, such as the hot melt composition described hereinabove, which is a solid at ambient temperature and pressure, said method comprising the steps of heating the composition to cause it to melt and maintaining the temperature thereof for ease of flow and uniform dispersion thereof onto the metal, applying the melted composition to the metal workpiece to form a film of such composition thereon, and allowing the film of said composition to cool and solidify.

The surface temperature of the metal at the time the hot melt composition is applied may vary, for example, from ambient temperature to just below the decomposition temperature thereof. Factors which will influence or determine the temperature of the metal at the time the composition is applied include processes which the metal is subjected to prior or subsequent to application of the composition, the melting point of the composition, and the temperature thereof at the time of application. Using the hot melt compositions described hereinabove, metal surface temperatures of about 20–125° C. at the time of application have been found particularly useful. The temperature of the hot melt composition should be higher than its melting temperature (preferably at least 10° C. higher and usually about 20°–40° C. higher) at the time of application for ease of flow and uniform dispersion of the composition onto the metal and coverage thereby.

The melted hot melt composition may be applied to the metal in a minimum of space utilizing existing equipment such as coilers used in steel mills prior to coiling, and because it quickly solidifies at ambient temperatures and becomes dry, non-blocking and relatively non-slippery, standard handling equipment such as lifting and feeding rollers. Stackers, and so on may also be used. The application method of this invention also eliminates the need for a dry-off oven since there is no water or solvent to remove from the hot melt composition.

In the annexed drawings:

FIG. 1 is a schematic diagram showing a metal processing line or system including an illustrative apparatus for applying the hot melt composition to a metal workpiece in accordance with application method of this invention;

FIG. 2 is an enlarged schematic transverse section through the reservoir and applicator of the apparatus used to coat the metal workpiece with such composition, taken on the plane of the line 2—2 of FIG. 1; and FIG. 3 is a partial transverse section on the plane of the line 3—3 of FIG. 2.

In FIG. 1 there is schematically shown a metal sheet or strip material processing line L including in the line a preferred apparatus 1 for applying the hot melt composition to the metal workpiece S, which may be in the form of strips or sheets of material cut into desired lengths as shown or may consist of a continuous coil of strip material which may either be recoiled after passing through the apparatus or cut into sheets and stacked using conventional uncoilers, recoilers and/or destacker and stacker equipment and the like. Regardless of the length of the metal workpiece S, it may be transported through the material processing line L on conventional conveyor and feed rolls 3.

In the illustrative coating apparatus shown in FIGS. 1 and 2, a reservoir 5 for the hot melt composition M is located near (preferably beneath) the applicator which applies the composition to the metal. The composition is desirably heated as by passing through heating means such as a steam coil 6 (although electrical or other heating methods are also suitable) which is usually located in reservoir 5 and which is adapted to provide good temperature control over a suitable range such as 30°–85° C., to cause the composition to melt and to remain liquid until after it has been applied to the metal but at the same time to insure against its being heated above its decomposition temperature.

The liquid composition is pumped by pump 15 through circulation piping 11 to the applicator. Pump 15 should, of course, have sufficient capacity to supply liquid composition to the applicator at the desired pressure, e.g., 10 psi, and simultaneously to recirculate a portion of said composition back to the reservoir as described hereinafter.

As previously noted, the applicator may be a spray head, brushing or flooding means, roller coater or the like. Roller coaters are preferred; the one shown FIGS. 2 and 3 comprises two rubber coating rolls 8 (which may be heated), one for coating each side of workpiece 5. As shown in FIG. 3, doctor rolls 9, in contact with coating rolls 8, can be horizontally adjusted so as to regulate the thickness of composition M on the coating rolls, which themselves may be vertically adjusted so as to regulate the amount of said composition transferred to the workpiece S. Drip trays 10 underneath the applicator feed excess hot melt composition back to reservoir 5.

The flow of hot melt composition M to the applicator may be controlled by means of valves 14. To aid in such control, a portion of the flow of such composition through circulation piping 11 is desirably caused to bypass the applicator and recirculate to the reservoir 5 through a suitable bypass conduit 12 and valve 13.

The use of steam, especially low pressure steam, as the source of heat for melting and maintaining the temperature of the composition has the advantage that the steam may be introduced into the circulation piping 11 through a conduit 16 and valve 17 both at the start of a run to preheat the same and also at the finish of a run to prevent composition solidification and buildup therein. Alternatively, circulating piping 11 may be provided with a jacket to permit circulation of steam around it at both the start and finish of a run. The discharge line 18 for the steam from steam coil 6 to condensate trap 19 also desirably passes around or through the housing of pump 15 to prevent solidification and accumulation of hot melt composition therewithin.

In addition to, or in place of, the use of an applicator (such as that shown in FIG. 2) adapted to meter the hot melt composition onto the metal surface, other methods for regulating the thickness of the film of such composition on the surface may be employed. These include control of the temperature of the composition and/or the metal, selection of compositions having different melting points (the higher the melting point, the more rapidly solidification will occur and the thicker will be the film thereof, other factors being the same), and regulating the rate of cooling of the metal after the composition has been applied thereto. Film thickness may also be regulated by the use of suitable removal means such as heated squeegee rolls, an air blast of regulated temperature, or the like.

Since the hot melt composition does not contain any water or other solvent, no dry-off oven is required to dry the metal after exiting from the coating apparatus 1. However, a suitable distance should preferably be provided from such exit of the metal from the coating appartus before the metal is stacked or recoiled to allow the coating of hot melt composition to cool to its solidification temperature to form a solid, usually continuous film on the metal; for example, a distance of 40 feet if the metal is moving at a rate of 600 feet per minute. This distance will vary, not only with variations in the rate of travel of the metal, but also with variations in the type and thickness of the metal as well as its temperature. In FIG. 1, for instance, there is shown a cleaning bath 25 for cleaning mill oil from the metal with good temperature control over a range such as 35°–75° C.; also a water rinse bath 26 which may have good temperature control over a similar temperature range. Adjacent the downstream end of the cleaner bath 25 there is desirably provided a pair of squeegee rolls 27 to avoid rinse contamination. Likewise, similar squeegee rolls 28 are desirably provided adjacent the downstream end of the rinse bath 26, which maybe supplemented by an air blast.

The method of this invention, when employed substantially as described herein, results in the production of metal workpieces which are adequately lubricated for subsequent working operations, especially drawing; protected against rust; and easily cleanable by commercial cleaning methods.

What is claimed is:

1. A method for lubricating metal during working thereof which comprises applying to said metal a lubricating composition which provides lubricity thereto and which comprises at least one ester of an aliphatic polycarboxylic acid having about 4–25 carbon atoms and a hydroxy compound having the formula $R'(OH)_n$, wherein $R'$ is a hydrocarbon-based radical and $n$ is an integer from 1 to 3; said composition melting within the range of about 30°–100° C.

2. A method according to claim 1 wherein the lubricating composition melts within the range of about 35°–70° C.

3. A method according to claim 2 wherein the ester is at least one neutral ester of an aliphatic polycarboxylic acid having about 5–10 carbon atoms and a saturated aliphatic alcohol having at least about 10 carbon atoms.

4. A method according to claim 3 wherein the alcohol is an alkanol.

5. A method according to claim 4 wherein the ester is at least one ester of a $C_{14-20}$ predominantly straight-chain alkanol or commercial mixture of such alkanols and adipic, azelaic or sebacic acid.

6. A method according to claim 5 wherein the ester is at least one neutral ester of adipic acid and a commercial mixture of pedominantly straight-chain $C_{14-18}$ 1-alkanols.

7. A method according to any of claims 1–6 wherein said lubricating composition additionally contains a carboxylic acid or derivative thereof, said derivative comprising an anhydride or lithium salt.

8. A method according to claim 7 wherein the carboxylic acid or derivative thereof is a substituted succinic acid in which the substituent is a hydrocarbon-based substituent, or a derivative thereof.

9. A method according to claim 8 wherein the carboxylic acid or derivative thereof is tetrapropenyl succinic anhydride.

10. A method according to any of claims 1–6 wherein the composition additionally contains a phosphorus acid salt having the formula

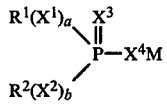

wherein M is a Group I metal, a Group II metal, aluminum, tin, cobalt, lead, molybdenum, manganese, nickel or ammonium; each of $R^1$ and $R^2$ is a hydrocarbon-based radical; each of $X^1$, $X^2$, $X^3$ and $X^4$ is oxygen or sulfur; and each of a and b is 0 or 1.

11. A method according to claim 10 wherein M is zinc; eacho of $R^1$ and $R^2$ is a lower alkyl radical; $X^1$ and $X^2$ are oxygen; $X^3$ and $X^4$ are sulfur; and a and b are each 1.

12. A method according to claim 7 wherein the composition additionally contains a phosphorus acid salt having the formula

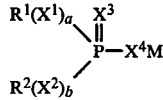

wherein M is a Group I metal, a Group II metal, aluminum, tin, cobalt, lead, molybdenum, manganese, nickel or ammonium; each of $R^1$ and $R^2$ is a hydrocarbon-based radical; each of $X^1$, $X^2$, $X^3$ and $X^4$ is oxygen or sulfur; and each of a and b is 0 or 1.

13. A method according to claim 12 wherein the carboxylic acid or derivative thereof is a substituted succinic acid in which the substituent is a hydrocarbon-based substituent, or a derivative thereof.

14. A method according to claim 13 wherein the carboxylic acid or derivative thereof is tetrapropenyl succinic anhydride.

15. A method according to claim 12 wherein M is zinc; each of $R^1$ and $R^2$ is a lower alkyl radical; $X^1$ and $X^2$ are oxygen; $X^3$ and $X^4$ is oxygen or sulfur; and each of a and b is 0 or 1.

16. A method according to any of claims 1–6 wherein the working comprises drawing.

17. A method according to claim 9 wherein the working comprises drawing.

18. A composition which melts within the range of about 30°–100° C. and which provides lubricity to metal surfaces, said composition comprising an ester of a carboxylic acid and at least one of a carboxylic acid or derivative thereof, said derivative comprising an anhydride or lithium salt, and a phosphorus acid salt having the formula

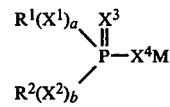

wherein M is a Group I metal, a Group II metal, aluminum, tin, cobalt, lead, molybdenum, manganese, nickel or ammonium; each of $R^1$ and $R^2$ is a hydrocarbon-based radical; each of $X^1$, $X^2$, $X^3$ and $X^4$ is oxygen or sulfur; and each of a and b is 0 or 1.

19. A composition according to claim 18 wherein the ester is at least one neutral ester of a saturated aliphatic alcohol having at least about 10 carbon atoms and an aliphatic polycarboxylic acid having about 4–20 carbon atoms.

20. A composition according to claim 19 wherein the alcohol is an alkanol.

21. A composition according to claim 20 wherein the ester is at least one ester of a $C_{14-20}$ predominantly straight-chain alkanol or commercial mixture of such alkanols and adipic, azelaic or sebacic acid.

22. A composition according to claim 21 wherein the ester is at least one neutral ester of adipic acid and a commercial mixture of predominantly straight-chain $C_{14-18}$ 1-alkanols.

23. A composition according to any of claims 18–22 which contains said carboxylic acid or derivative thereof.

24. A composition according to claim 23 wherein the carboxylic acid or derivative thereof is a substituted succinic acid in which the substituent is a hydrocarbon-based substituent, or a derivative thereof.

25. A composition according to claim 24 wherein the carboxylic acid or derivative thereof is tetrapropenyl succinic anhydride.

26. A composition according to any of claims 18–22 which contains said phosphorus acid salt.

27. A composition according to claim 26 wherein M is zinc; each of $R^1$ and $R^2$ is a lower alkyl radical; $X^1$ and $X^2$ are oxygen; $X^3$ and $X^4$ are sulfur; and a and b are each 1.

28. A composition according to any of claims 18–22 which additionally contains an antioxidant.

29. A composition according to claim 25 which additionally contains an antioxidant.

30. A method of applying to a metal workpiece a metal working lubricant composition,
said lubricant composition melting within the range of about 30°–100° C. and comprising at least one ester of a carboxylic acid;
which method comprises the steps of
storing the lubricant composition in a reservoir;
heating said lubricant composition in the reservoir to cause it to melt, and maintaining the temperature thereof for ease of flow and uniform dispersion thereof onto the workpiece;

pumping said melted lubricant composition through circulation piping to an applicator;

conveying the workpiece past said applicator which applies said melted lubricant composition to the workpiece to form a film of said lubricant composition thereon;

causing a portion of said melted lubricant composition which is pumped from the reservoir to bypass said applicator and recirculate to the reservoir to control the flow of said melted composition to said applicator;

and allowing said film of lubricant composition to cool and solidify on the workpiece.

31. A method according to claim 30 wherein steam is used to heat the composition, and steam is also introduced into the circulation piping at the start of a run to preheat the same and at the finish of a run to prevent buildup of such composition therein.

* * * * *